United States Patent [19]

Grier et al.

[11] Patent Number: 4,785,585
[45] Date of Patent: Nov. 22, 1988

[54] VEHICLE DOOR WITH SEPARABLE DOOR HARDWARE MODULE

[75] Inventors: Donald A. Grier, Mt. Clemens; Theodore Nielson, Jr., Troy, both of Mich.

[73] Assignee: The Budd Company, Troy, Mich.

[21] Appl. No.: 50,508

[22] Filed: Apr. 14, 1987

[51] Int. Cl.$^4$ .............................................. B60J 5/04
[52] U.S. Cl. ............................................ 49/502; 49/349
[58] Field of Search ............... 49/502, 503, 501, 380, 49/348–353; 296/146

[56] References Cited

U.S. PATENT DOCUMENTS

| | | | |
|---|---|---|---|
| 2,288,577 | 6/1942 | Trautvetter | 49/502 |
| 2,658,790 | 11/1953 | Fish et al. | 49/501 X |
| 2,707,320 | 5/1955 | Fish | 49/502 X |
| 2,797,129 | 6/1957 | Renno | 49/502 |
| 4,306,381 | 12/1981 | Presto | 49/502 |
| 4,328,642 | 5/1982 | Presto | 49/502 |
| 4,405,173 | 9/1983 | Piano | 296/146 |
| 4,416,088 | 11/1983 | Feucht et al. | 49/502 |
| 4,512,240 | 4/1985 | Mahler et al. | 49/503 X |
| 4,529,244 | 7/1985 | Zaydel | 296/146 X |
| 4,603,894 | 8/1986 | Osenkowski | 296/146 X |
| 4,606,148 | 8/1986 | Gandini | 49/502 |
| 4,662,115 | 5/1987 | Ohya et al. | 49/503 X |

FOREIGN PATENT DOCUMENTS 2236678 2/1975 France ............................. 49/502

Primary Examiner—Philip C. Kannan
Attorney, Agent, or Firm—Harness, Dickey & Pierce

[57] ABSTRACT

A main door unit including an inner/outer panel subassembly is mounted to the vehicle in a generally conventional manner so that it can be painted along with other parts of the vehicle during on-line assembly. However, the inner panel includes a generally centrally located enlarged opening therein and is devoid of any substantial door hardware during painting. The door hardware including the window glass, lower front and rear glass tracks and the regulator mechanisms for the window are mounted to a plate to form an integral door hardware module. After painting, the module is mounted to the inner panel with the window glass tracks mating with upper glass tracks in the inner/outer panel subassembly. The plate covers the opening in the inner panel and a trim pad can be used to cover the plate and peripheral portions of the exposed interior inner panel for cosmetic purposes.

14 Claims, 3 Drawing Sheets

VEHICLE DOOR WITH SEPARABLE DOOR HARDWARE MODULE

BACKGROUND OF THE INVENTION

1. Technical Field

This invention relates to vehicles and, more particularly, to doors for land vehicles.

2. Discussion

Although a variety of door constructions have been proposed in the technical and patent literature, conventional practice is for vehicular doors to include an inner and outer panel fixed together about their edges thereby forming a hollow shell in the interior lower portions thereof. The inner panel includes relatively small access openings to permit hardware such as window regulator mechanisms and the like to be inserted therethrough and attached during the typical on-line assembly process. Of course, this tends to be an awkward operation for the worker and can lead to improper installation.

U.S. Pat. No. 4,306,381 to Presto discloses a door construction for solving this general problem. However, some of the parts in the inner panel subassembly are exposed and accordingly must be painted to match the rest of the door. It is envisioned that the inner panel subassembly is produced off line and then attached as one of the final steps during on-line assembly. Consequently, it appears that this would require that the on-line and off-line assembled parts of the door be separately painted. Of course, it is not always possible to provide a perfect color match under these circumstances.

SUMMARY OF THE INVENTION

According to the present invention, all of the exposed portions of the inner and outer panel that need to be painted can be painted during conventional on-line assembly of the vehicle. The inner panel includes a generally centrally located enlarged opening but most of the door hardware is not attached to the panel. Instead, the door hardware is attached off line to a plate forming part of a door hardware module that contains such things as the window glass, lower front and rear glass tracks, and window regulator mechanisms for controlling the vertical movement of the window. As one of the final assembly steps, the module is attached to the inner panel after the inner/outer panels have been painted. An interior trim panel may be added to cover the plate and peripheral portions of the lower/inner panel to provide a cosmetic appearance for the completed door.

BRIEF DESCRIPTION OF THE DRAWINGS

The various advantages of the present invention will become apparent to those skilled in the art after reading the following specification and by reference to the drawings in which.

DESCRIPTION OF THE PREFERRED EMBODIMENT

Figure 1:
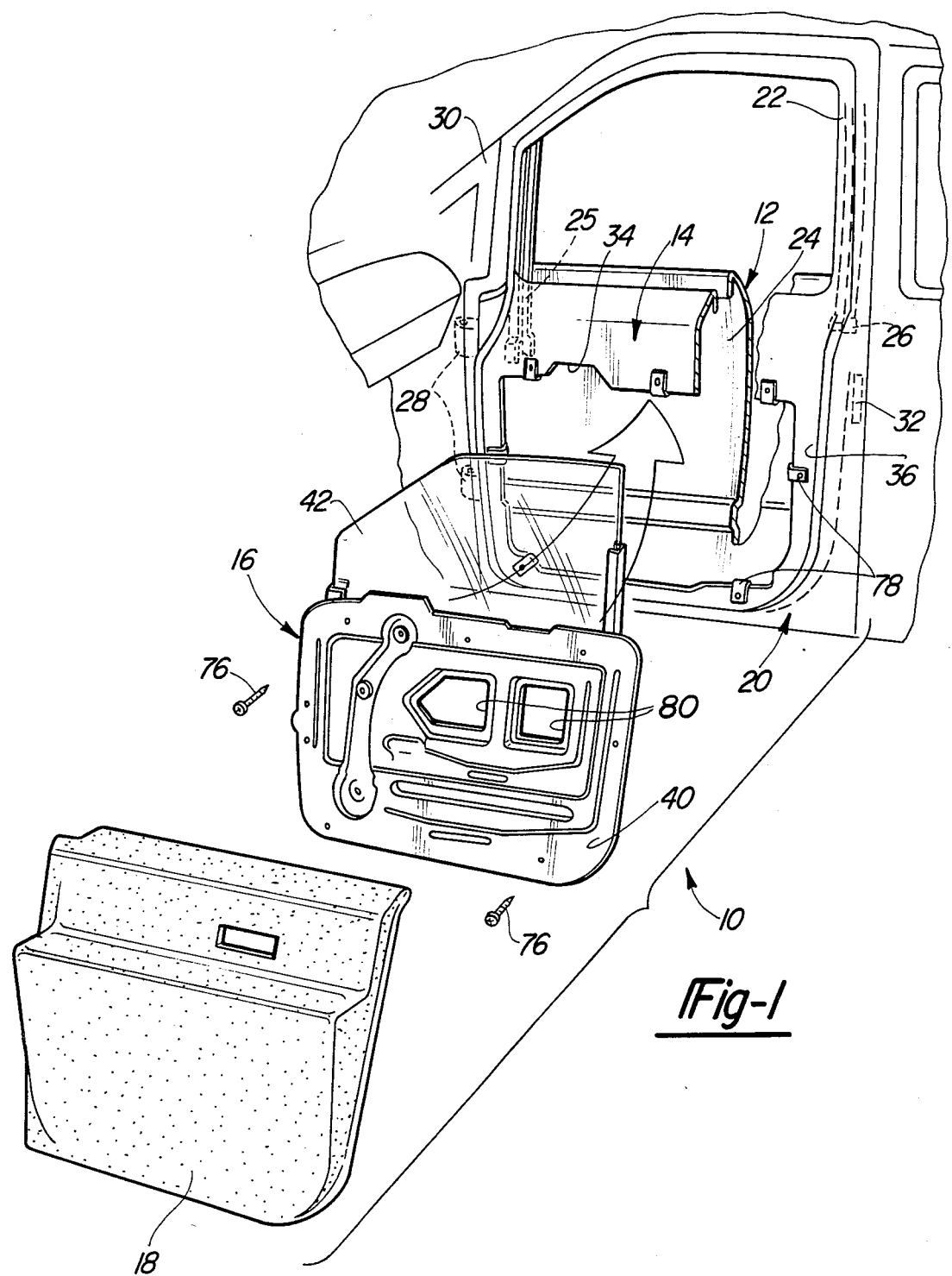
FIG. 1 is a partial exploded perspective view of a vehicle including a door made in accordance with the teachings of the present invention as viewed from the interior of the vehicle.

With reference to the drawings, vehicle door 10 includes four main parts: an outer panel 12, an inner panel 14, a door hardware module 16 and an interior trim pad 18. The outer panel 12 and inner panel 14 are secured together to form a main door unit 20 which, to a large extent, is of conventional design. In this example, the outer panel 12 and inner panel 14 are metal stampings which are hemmed together to provide a window frame portion 22 above the belt line and defining a hollow interior cavity 24 below the belt line. The window frame portion 22 encompasses upper front 25 and rear 26 glass track sections for receiving upper edges of the window when it is in its raised position. As conventional, window frame 22 also includes suitable weather stripping and the like. One side of the main door unit 20 also includes suitable hinge devices 28 for swingingly mounting main door unit 20 onto the body of the vehicle 30 in a conventional manner. Main door unit 20 may also include suitable locking mechanisms designated by the numeral 32.

Thus, the main door unit 20 is designed to be mounted to the vehicle body as is conventional practice during online assembly. This enables the main door unit 20 to be painted along with vehicle body to thereby ensure good color matching. However, when the vehicle is painted, the module 16 is not yet attached. On the contrary, module 16 can be completely assembled off line, for example, by a vendor to the vehicle manufacturer. None of the parts on module 16 need to be painted and, consequently, color matching is no problem. In addition, the module 16 is preassembled into one substantially integral unit ready for easy attachment as will appear. Consequently, the awkward step-by-step attachment of door hardware through small access openings discussed above is substantially eliminated. The vehicle manufacturer also benefits from lower inventory requirements and an improvement in overall product quality.

A study of the drawings will reveal that the inner panel 14 includes a generally central located enlarged opening 34 in its inner face 36. Opening 34 is dimensioned so that it will permit the window and associated door hardware on module 16 to be inserted therethrough as will be discussed later herein.

Focusing attention on module 16, it is provided with a mounting plate 40 whose peripheral dimensions are larger than the door opening 34. Plate 40 is preferably made of preprimed galvanized steel or other rigid material that is rust resistant. Onto plate 40 is attached window glass 42, lower front 44 and rear 46 window glass tracks and suitable window regulating means for controlling vertical movement of window 42. The window regulator means illustrated in the drawings include electric motor 50 driving a sector gear 52 coupled to an arm 54 through a link 56. The door regulator mechanisms are preferably attached to a doubler reinforcement member 58 suitably attached to plate 40 to provide it with additional rigidity. Window regulator arm 54 is provided with a roller 55 at its distal end which rides in a glass attaching "U-channel" 60. Channel 60 is connected to the window glass 42 by way of fasteners 62. It should be understood that other automatic window regulating devices can be used, as well as manual constructions.

Completing the description of module 16, wiring harnesses 64 and 66 are illustrated for controlling the door motor 50 and auxiliary devices such as automatic door locks and the like, respectively. Preferably, a vapor and sound barrier sheet 68 is adhered to the inner face of plate 40 by way of suitable adhesive sealer 70.

Thus, it can be appreciated the module 16 is in the form of a one-piece unit that can be assembled and tested off line and then shipped to the vehicle manufacture ready to be assembled to the main door unit 20.

Figure 2:
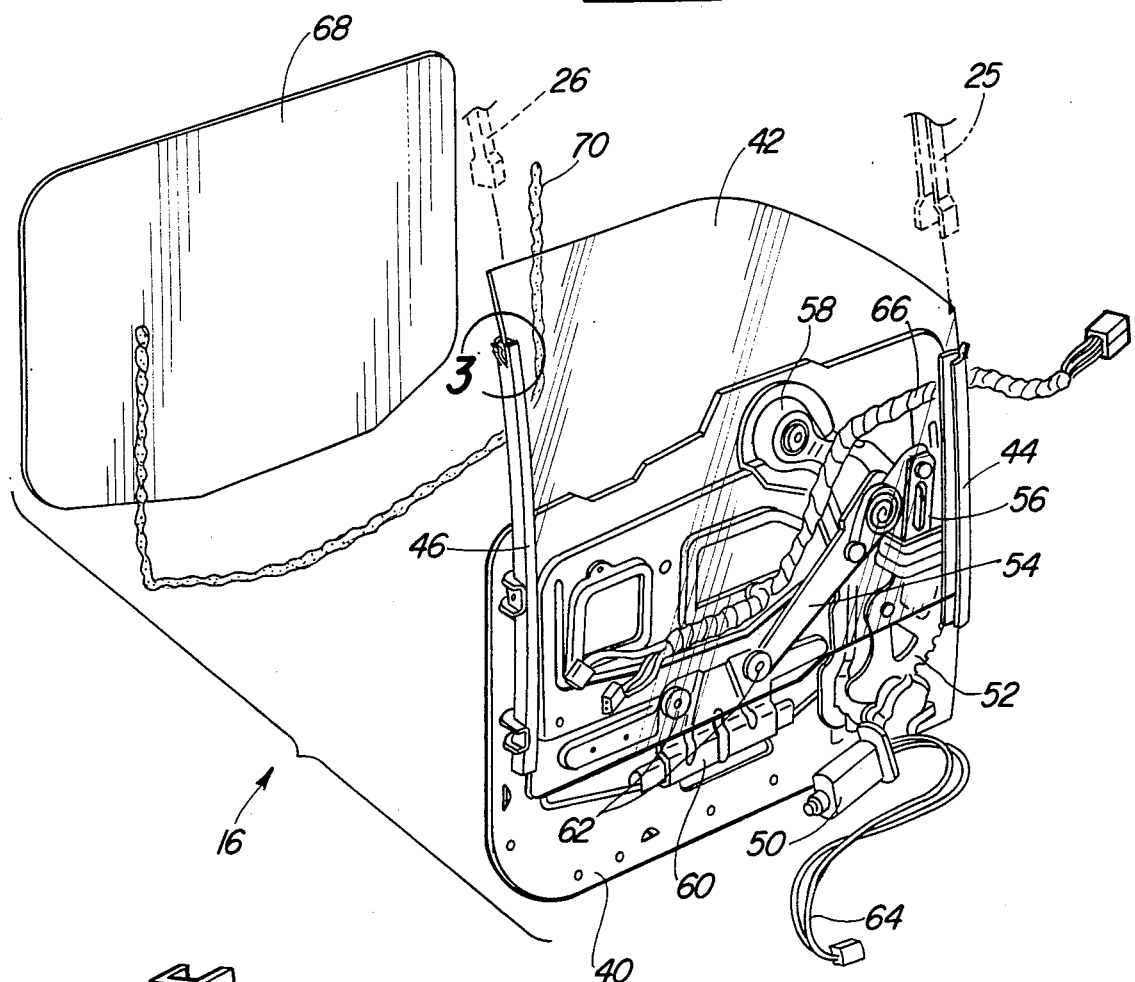
FIG. 2 is an exploded perspective view primarily of the door hardware module as viewed from a side opposite to that of FIG. 1.
Figure 3:
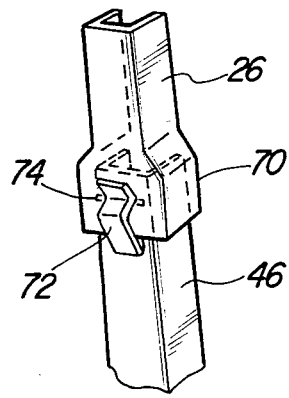
FIG. 3 is a partial perspective view illustrating the detachable coupling between upper and lower glass track sections.
Figure 4:
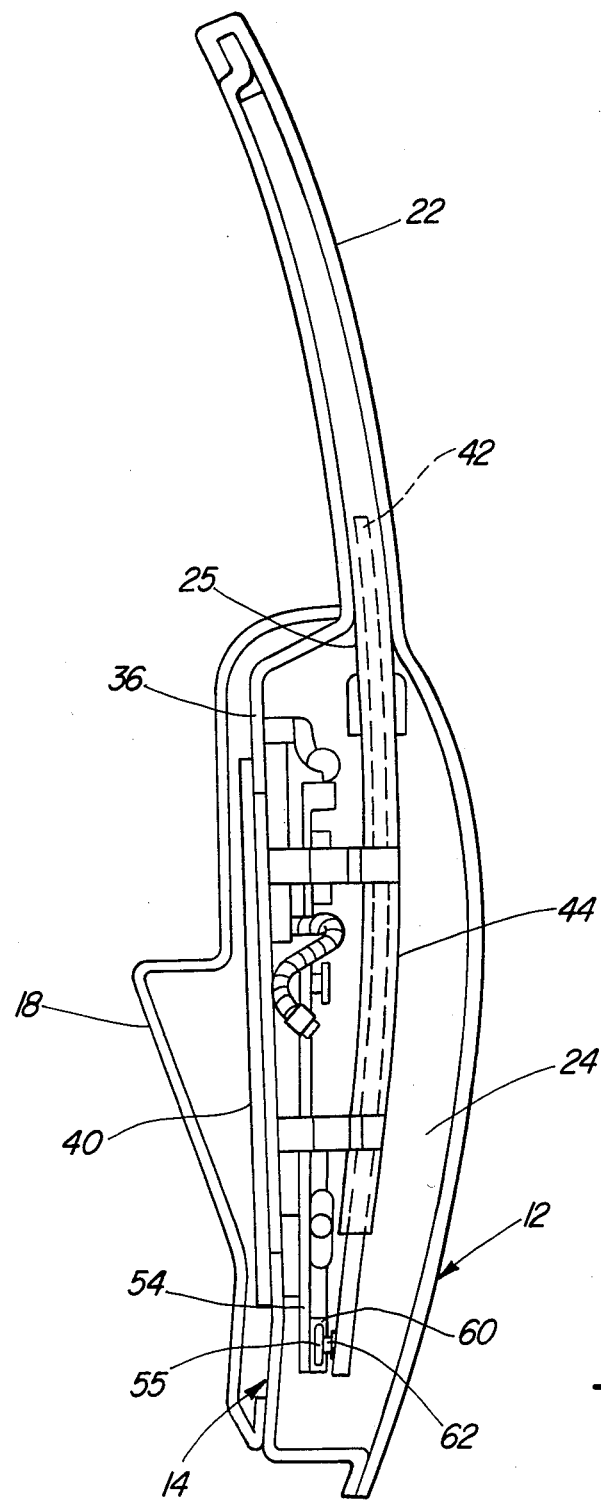
FIG. 4 is a simplified cross-sectional view of the completed door.

Module 16 is easily assembled by inserting window 42 through opening 34 and sliding the edges of window 42 into the upper glass tracks 25, 26 already contained within the main door unit 20. As can be seen most clearly in FIGS. 2 and 3, lower ends of the upper glass tracks 25, 26 and upper ends of the lower glass tracks 44, 46 are interlockingly fitted together to thereby bring the two sets of track sections into alignment. Various detachable coupling constructions can be used but, in this embodiment, this is provided by an enlarged head 70 on the upper sections onto which the lower sections slideably fit. A spring clip 72 on the lower track section snaps into a detent 74 in the head when the lower section has been inserted to the proper extent.

Once the window has been inserted, the plate 40 is brought flush against the inner face 36 of the inner panel 14 and attached thereto via fasteners 76 and mounting brackets 78. The peripheral dimension of plate 40 is larger than that of the opening 34 so that the plate 40 covers the opening.

To complete the door assembly, it is sometimes necessary to connect th various wiring harnesses to certain internal components such as door locks and the like. This can be easily accomplished by pulling back the sheet 68, manually making the necessary connections through access opening 80, and then resecuring the sheet 68. Thereafter, the plate 40 and the remaining exposed peripheral portions of the lower/inner panel 14 are covered by a conventional trim pad 18.

The various advantages of the present invention will become apparent to those skilled in the art after having the benefit of a study of the specification, drawings and following claims.

What is claimed is:

1. A vehicle door comprising:
    an outer panel;
    an inner panel having a generally centrally located enlarged opening therein, the inner and outer panel being secured together to form a main door unit defining at least a lower hollow cavity and a window frame portion with upper glass track sections therein;
    means for mounting the main door unit to a body of the vehicle whereby the main door unit can be painted simultaneously with the body of the vehicle;
    a door hardware module having a plate to which door hardware is attached, said door hardware at least including a window glass and lower glass track sections therefor; and
    means for attaching the module to the inner panel so that the door hardware and window glass fit within said cavity, with the lower and upper glass track sections being detachably coupled together thereby bringing them into alignment.

2. The door of claim 1 wherein said plate is preprimed galvanized steel and includes a reinforcement member attached thereto onto which at least part of said window regulator means is attached.

3. The door of claim 1 wherein said door hardware further includes window regulator means for controlling vertical movement of the window glass.

4. The door of claim 1 wherein said plate covers the opening in the inner panel and is attached thereto about its periphery by a plurality of fasteners.

5. The door of claim 4 which further comprises:
    a trim pad covering said plate and exposed peripheral portions of an inner face of the inner panel.

6. The door of claim 5 wherein said door hardware further includes at least one wiring harness, and wherein said plate includes at least one access opening therein permitting worker access to the harness.

7. A vehicle door comprising:
    an outer panel having a lower skin and an upper window frame portion;
    an inner panel having a generally corresponding upper window frame portion attached to the outer panel, lower portions of the inner panel and the outer skin defining a hollow cavity, an inner face of the inner panel including a generally centrally located enlarged opening therein of a given longitudinal dimension;
    upper glass track sections in the window frame;
    a door hardware module having a plate with a peripheral dimension larger than the opening in the inner panel, front and rear lower glass track sections vertically extending on opposite edges of an outer face of said plate, a window glass slideably mounted in the lower glass tracks, and window regulator means mounted to the plate for controlling vertical movement of the window;
    fastening means for connecting the plate to the inner panel so that the plate covers the opening in the inner panel, with the upper and lower glass track sections being interfitted at their adjacent edges thereby bringing them into alignment; and
    a trim pad covering the plate and peripheral portions of the inner face of the inner panel.

8. The door of claim 7 which further comprises:
    a reinforcement member to which at least a part of said window regulator means is attached.

9. The door of claim 7 wherein upper edges of the lower glass track sections include an enlarged head with a detent on a side thereof, and wherein lower edges of the upper glass track sections slidingly fit within the head and include a spring clip for engaging said detent.

10. The door of claim 7 wherein the spacing between the front and rear lower glass track section is less than the given longitudinal dimension of the opening in the inner face of the inner panel.

11. Apparatus for use with a main door unit having an outer panel with a lower skin and an upper window frame portion, upper glass track sections in the window frame portion, and an inner panel attached to the outer panel and configured so that it defines a lower hollow cavity, the main door unit being mounted to a body of a vehicle so that the outer panel can be painted simultaneously with the body of the vehicle, said apparatus comprising:
    a door hardware module having a plate to which door hardware is attached, said door hardware at least including a window glass and lower glass track sections therefor, the door hardware module being dimensioned so that the plate can be attached to the inner panel with the upper and lower glass track sections being coupled together and cooperating with each other to provide a guide for the window glass in both the window frame portion and hollow cavity of the door.

12. The apparatus of claim 11 wherein upper edges of the lower glass track sections extend beyond an upper edge of the plate.

13. The apparatus of claim 11 wherein the plate is larger than the opening so that the plate covers the opening when it is mounted to the inner panel.

14. The apparatus of claim 11 which further comprises:
   window regulator means for controlling vertical movement of the window, said window regulator means being operably connected to the window glass and to the plate so that operation of the window glass can be tested prior to the door module being mounted to the main door unit.

* * * * *